United States Patent
Granqvist et al.

(10) Patent No.: US 6,965,813 B2
(45) Date of Patent: Nov. 15, 2005

(54) CLIMATE CONTROL SYSTEM AND METHOD FOR CONTROLLING SUCH

(75) Inventors: Claes-Göran Granqvist, Uppsala (SE); Andris Azens, Uppsala (SE); Joakim Karlsson, Huddinge (SE); Gunnar Niklasson, Uppsala (SE); Arne Roos, Uppsala (SE)

(73) Assignee: Forskarpatent I Uppsala AB, Uppsala (SE)

( * ) Notice: Subject to any disclaimer, the term of this patent is extended or adjusted under 35 U.S.C. 154(b) by 159 days.

(21) Appl. No.: 10/377,724

(22) Filed: Mar. 4, 2003

(65) Prior Publication Data

US 2003/0233172 A1 Dec. 18, 2003

Related U.S. Application Data

(63) Continuation of application No. PCT/SE01/01861, filed on Sep. 3, 2001.

(30) Foreign Application Priority Data

Sep. 4, 2000 (SE) .............................................. 0003112

(51) Int. Cl.⁷ .............................................. G05B 13/00
(52) U.S. Cl. ...................... 700/276; 700/278; 700/299; 700/300
(58) Field of Search ................................ 700/275, 276, 700/277, 278, 299, 300; 236/1, 97

(56) References Cited

U.S. PATENT DOCUMENTS

| | | | |
|---|---|---|---|
| 4,623,969 A | | 11/1986 | Bensoussan et al. |
| 4,887,890 A | | 12/1989 | Scherber et al. |
| 5,237,169 A | | 8/1993 | Grehant |
| 6,039,390 A | * | 3/2000 | Agrawal et al. ............ 296/211 |
| 6,064,949 A | * | 5/2000 | Werner et al. ............. 700/300 |
| 6,119,186 A | * | 9/2000 | Watts et al. ................ 710/104 |

FOREIGN PATENT DOCUMENTS

| | | |
|---|---|---|
| WO | WO 82/02608 | 8/1982 |
| WO | WO 96/13751 | 5/1996 |

* cited by examiner

Primary Examiner—Leo Picard
Assistant Examiner—Charles Kasenge
(74) Attorney, Agent, or Firm—Young & Thompson

(57) ABSTRACT

The invention relates to a climate control system comprising at least one radiation reducer and a climate control unit for controlling the radiation reducer. Which system further comprises a usage detection system coupled to the climate control unit. It also relates to a method of climate control in a room, using a climate control system comprising at least one radiation reducer, which method comprises the steps of detecting if the room is in use or not, if in use, setting the radiation reducer in a mode of high transmittance, if not in use, setting the radiation reducer in a mode of low transmittance.

6 Claims, 6 Drawing Sheets

CLIMATE CONTROL SYSTEM AND METHOD FOR CONTROLLING SUCH

This application is a continuation of International application Ser. No. PCT/SE01/01861 filed Sep. 3, 2001.

TECHNICAL FIELD OF THE INVENTION

The present invention relates to a climate control system and a method for controlling such, and more specifically to a climate control system and a method capable of increasing the comfort and lowering the energy consumed for the heating or cooling of a building.

TECHNICAL BACKGROUND

There are mainly two situations when energy is consumed to maintain the indoor climate in a building; when heating or cooling is required. Heating of a building is done in situations when the outdoor temperature is lower than the desired indoor temperature, and when heating through absorption of heat radiation and other internal sources than the heating system is insufficient. Throughout this application heat radiation refers to electromagnetic radiation in the visible and solar ranges, i.e. wavelengths ($\lambda$) between $3\times10^{-7}$ and $3\times10^{-6}$ m. The main source of this heat radiation is of course the sun. This heat radiation is absorbed by the outside walls and the roof, as well as by the interior of the building, if the radiation passes through a window. Cooling, on the other hand, has to be done when the outdoor temperature is essentially higher than the desired indoor temperature, or when the combined effect of e.g. the outdoor temperature, heat radiation, and heating by other internal sources than the heating system, produces an indoor temperature that is higher than desired.

In large parts of the world, heating of buildings by intake of heat radiation through windows is a big problem, especially for buildings with large window areas. It is therefore of great interest to reduce this contribution to the heating by controlling this intake of heat radiation. On the other hand, such a system must not reduce the intake of daylight to such an extent that there is insufficient daylight for the persons being inside the building.

Today, the most frequently used techniques for variably reducing incoming heat radiation through windows include different types of mechanical shades, such as blinds, curtains and the like, that are either completely non-transparent, semi transparent or translucent.

In the near future "smart windows" may be commonly used in a large group of applications. Smart windows are particularly suitable for varying the intake of daylight as their transmittance of the whole or a part of the heat radiation range, may be continuously changed from transparent to non-transparent.

In this application a "smart window" represents any type of variably transmissive element integrated in a window pane, such as electrochromic elements, polymer dispersed liquid crystal elements (PDLC), dispersed particle elements, gasochromic and "light valves". Further, a "variable radiation reducer" represents any system for reducing incoming heat radiation through windows, i.e. mechanical systems as well as smart windows. Still further, the term "non-transparent" will be used when referring to the state of lowest possible transmission for any variable radiation reducer, even though a particular variable radiation reducer does not reach a fully non-transparent state. Windows comprise vertical, inclined and horizontal glazings.

Known systems comprising smart windows, such as the systems presented in WO 96/13751, include thermal and/or radiation sensors for controlling the transmission through the windows. In these systems the transmission through the windows is controlled to achieve a predetermined temperature or radiation level, and the main goal is to save energy.

Smart windows are possible to combine with a solar cell and a battery, so that the windows become electrically self-supplying. In such a case a local control unit is arranged at the window. This control unit may then be connected to the sensors and an interface for setting the desired values for the temperature or radiation. This connection may either be of a wired or wireless type. A system of this kind may further incorporate one or more central control units, which coordinate several smart windows in a system.

SUMMARY OF THE INVENTION

The object of the invention is to provide a new climate control system and a new method of climate control, which overcome the drawbacks of the prior art devices and methods.

According to one embodiment there is provided, a climate control system comprising at least one variable radiation reducer capable of variably reducing the transmission of heat radiation through a window, and a climate control unit coupled to and adapted to control the variable radiation reducer. The system further comprises a usage detection system for detecting if the room is in use or not.

The usage detection system is coupled to the climate control unit, and provides a "non-use signal" when the room is not in use and an "in-use signal" when the room is in use.

The climate control unit is arranged to set the variable radiation reducer in a non-transparent mode, in response to a "non-use signal" from the usage detection system, whereby a substantial part of the heat radiation is prevented from entering the room, and it is arranged to set the variable radiation reducer in a transparent mode, in response to an "in-use signal" from the usage detection system, whereby a normal daylight level is permitted to pass through the window.

According to another embodiment there is provided, a method of climate control in a room, using a climate control system comprising at least one variable radiation reducer capable of variably reducing the transmission of heat radiation through a window, and a climate control unit coupled to and adapted to control the variable radiation reducer, which method comprises the steps of:

detecting, with a usage detection system, if the room is in use or not, the usage detection system being coupled to the climate control unit, and providing a "non-use signal" when the room is not in use and an "in-use signal" when the room is in use, in response to a "non-use signal" from the usage detection system, controlling the variable radiation reducer to be in a non-transparent mode, by means of the climate control unit, whereby a substantial part of the heat radiation is prevented from entering the room, and in response to an "in-use signal" from the usage detection system, controlling the variable radiation reducer to be in a transparent mode, by means of the climate control unit, whereby a normal daylight level is permitted to pass through the window.

According to still another embodiment there is provided, a method of climate control in a room, using a climate control system comprising at least one variable radiation reducer capable of variably reducing the transmission of heat radiation through a window, and a climate control unit coupled to and adapted to control the variable radiation reducer, which method comprises the steps of:

detecting, with a usage detection system, if the room is in use or not, the usage detection system being coupled to the climate control unit, and providing a "non-use signal" when the room is not in use and an "in-use signal" when the room is in use, detecting with a temperature sensor if the room should be cooled or heated, the temperature sensor being coupled to the climate control unit, and providing a "cool-signal" when the room should be cooled and a "heat-signal" when the room should be heated, in response to an "in-use signal" from the usage detection system and a "cool-signal" from the temperature sensor, controlling the variable radiation reducer to be in a low-transparent mode defined by a low-transmittance parameter, and other parameter control systems in accordance with predefined local control parameters, by means of the climate control unit, whereby at least a part of the heat radiation is prevented from entering the room, unless the low-transmittance parameter is set to a value that corresponds to full transmittance, in response to a "non-use signal" from the usage detection system and a "cool-signal" from the temperature sensor, controlling the variable radiation reducer to be in a non-transparent mode, and other parameter control systems in accordance with predefined global control parameters, by means of the climate control unit, whereby a substantial part of the heat radiation is prevented from entering the room, in response to an "in-use signal" from the usage detection system and a "heat-signal" from the temperature sensor, controlling the variable radiation reducer to be in a high-transparent mode defined by the high-transmittance parameter, and other parameter control systems in accordance with predefined local control parameters, by means of the climate control unit, whereby at least a part of the heat radiation is allowed to enter the room, and in response to a "non-use signal" from the usage detection system and a "heat-signal" from the temperature sensor, controlling the variable radiation reducer to be in a transparent mode, and other parameter control systems in accordance with predefined global control parameters, by means of the climate control unit, whereby a maximum of the heat radiation is allowed to enter the room.

One advantage with the system and method according to the invention is that they, compared to prior art devices and methods, improve the indoor comfort by providing automatic control of indoor climate parameters comprising light level, incoming daylight and temperature, according to a set of predefined control parameters that preferably are set by the local user.

Another advantage is that the system and method reduce the energy consumption, and may be integrated with the central control system in an "intelligent building".

A further advantage is that the system and method provide extensive possibilities of adapting the climate according to personal comfort profiles, whereby the user-comfort is further increased.

Still a further advantage is that the system and method provide pre-activation of an in-use comfort profile, whereby possible inconveniences due to initial poor climate are avoided.

Embodiments of the invention are defined in the dependent claims.

SHORT DESCRIPTION OF THE FIGURES

DETAILED DESCRIPTION OF PREFERRED EMBODIMENTS

The basic idea behind the system of the present invention is that, if a room needs to be cooled, the transmission of heat radiation through the windows of the room is automatically kept to a minimum when the room is not in use. The expression "A room in use" is herein defined as a room in which at least one person is present. By this action the radiation induced heating of the room is kept to a minimum at times when no one uses the room, whereby the energy needed to cool the room is substantially reduced.

Figure 1:
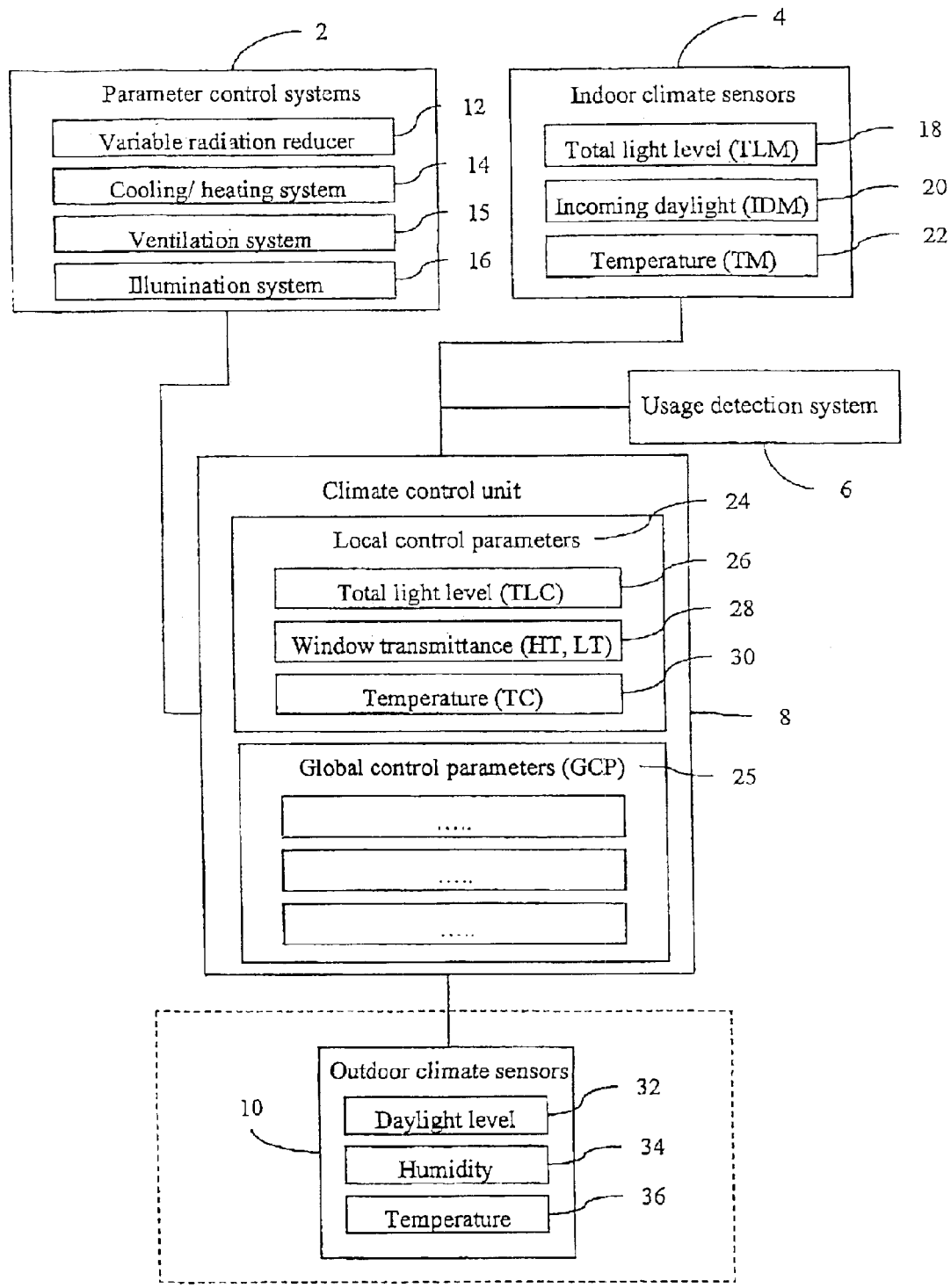
FIG. 1 is a block diagram showing a climate control system according to the present invention.

In a basic embodiment, the climate control system of the invention operates independently of the other climate systems of a building, such as the cooling/heating system and the illumination system. With reference to FIG. 1, a first embodiment of a climate control system for a room comprises a variable radiation reducer 12 arranged to variably control the intake of external heat radiation into the room, a climate control unit 8 and a usage detection system 6. The usage detection system 6 is coupled to the climate control unit 8, and provides a "non-use signal" when the room is not in use and an "in-use signal" when the room is in use. The climate control unit (8), is arranged to respond to a "non-use signal" from the usage detection system (6), by setting the variable radiation reducer (12) in a non-transparent mode, whereby a substantial part of the heat radiation is prevented from entering the room. The climate control unit (8), is further arranged to respond to an "in-use signal" from the usage detection system (6), by setting the variable radiation reducer (12) in a transparent mode, whereby a normal daylight level is permitted to pass through the window. As a result of this, the climate control system of this embodiment always sets the variable radiation reducer 12 in a non-transparent mode when a room, or a part thereof, is not in use, and in transparent mode when the room or a part thereof is in use, irrespective of the temperature situation.

The accompanying method for controlling such a climate control system, is then:

detecting, with the usage detection system 6, if the room is in use or not, in response to a "non-use signal" from the usage detection system 6, controlling the variable radiation reducer 12 to be in a non-transparent mode, by means of the climate control unit 8, whereby a substantial part of the heat radiation is prevented from entering the room, and in response to a "in-use signal" from the usage detection system 6, controlling the variable radiation reducer 12 to be in a transparent mode, by means of the climate control unit 8, whereby a normal daylight level is permitted to pass through the window.

The usage detection system may e.g. be based on movement detection, radiation detection or the like. Alternatively, the usage detection system may be an active system, in which the persons using a room carry an identification device, which is registered by the detection system. If the detector registers no usage for a predetermined amount of time, the climate control system reduces transmission of heat radiation to a low value. Simple climate control comprising usage detection systems are known from U.S. Pat. No. 4,623,969 and WO 8202608, which hereby are incorporated by reference. These systems basically describe how a control system for the present invention may be designed, but they lack a number of the core features of the invention.

In more preferred embodiments the climate control system of the present invention, the heating/cooling system (the daylight control system), the ventilation system and the illumination system in a building, are integrated into a total climate control system. Such an integrated control system assures that a minimum of energy is needed to keep the desired climate and light level inside the building at all times. Furthermore, such a system is preferably arranged in such a manner that each room in the building can be independently controlled according to a local set of climate parameters. Examples of climate parameters to be set for each room are temperature, incoming daylight level and total light level. In some cases, different sections of a room may be independently controlled.

For each room to be controlled, the control system registers internal parameters such as temperature, incoming daylight level, total light level and usage (as mentioned in detail above). Further, the climate control system may detect external parameters such as temperature, daylight intensity level, humidity. These parameters, together with geometric and physical information regarding the building, are used as input data in the control system.

In a preferred embodiment of the present invention, which is shown in FIG. 1, the climate control system is comprised of parameter control systems 2, indoor climate sensors 4 and a usage detection system 6, which all are coupled to a climate control unit 8. Optionally, the climate control system further comprises outdoor climate sensors 10.

The parameter control systems 2 comprise at least one variable radiation reducer 12, a cooling/heating system 14, a ventilation system 15 and an illumination system 16.

The indoor climate sensors 4 comprise, in each room wherein the climate is to be controlled, at least one sensor for detection of a total light level 18 (TLM), at least one sensor for detection of an incoming daylight level 20 (IDM), and at least one sensor for detection of a temperature 22 (TM). The total light level sensor 18 is arranged such that it registers the light level in the room, which is a sum of incoming daylight and light produced by the illumination system 16. The total light level sensor 18 is preferably arranged in the vicinity of a point-of-use in the room, such that an appropriate light level is achieved where it is needed, e.g. at a writing-desk or the like. The incoming daylight sensor(s) 20 is arranged such that it registers the amount of daylight that enters the room through the window(s). The temperature sensor 22 is coupled to the climate control unit 8, and it provides a "cool-signal" when the room should be cooled and a "heat-signal" when the room should be heated. Each room further comprises a usage detection system 6, for detecting if the room is being used or not.

The outdoor climate sensors 10 comprise sensors for detection of daylight level 32, humidity 34, and temperature 36. The detected levels from these detectors are then used by the climate control unit 8 when controlling the indoor climate, but details regarding such control strategies lie outside the scope of this application and hence they are not further discussed herein.

The climate control unit 8 comprises a microprocessor unit, which controls the indoor climate in accordance with the method described below. The desired indoor climate is defined by a set of predefined local control parameters 24 and global control parameters 25 (GCP). The local control parameters 24 comprise parameters defining a total light level 26 (TLC), window transmittance 28 (HT, LT) and temperature 30 (TC) that are local for a single room or a part of a room. Preferably, the user sets the local control parameters 24 using a dedicated control panel (not shown) in the room, such that maximum comfort is achieved. Alternatively, the control panel may be substituted by a remote control or a software control panel running on a computer coupled to the climate control unit 8. The global control parameters 25 mainly concern regulation of the climate during long non-use periods, such as lowering/rising the temperature and turning off the ventilation system and the like, but such measures are well known in prior art and therefore not further discussed in this application.

The total light level parameter 26 is a value that defines a desired light level at the position of the total light level sensor 18, and the climate control unit 8 is arranged to keep this level steady by adjusting the illumination system 16 and/or the variable radiation reducer 12.

The window transmittance parameters 28 preferably comprise a low-transmittance parameter (LT) defining the lowest level of incoming daylight that is accepted by the user, and a high-transmittance parameter (HT) defining the highest level of incoming daylight that is accepted by the user. These two parameters are essential as they allow the user of the room to avoid an unwanted excess or deficiency of daylight in the room, in situations when the climate control system from an energy minimization point of view strive towards such conditions.

The climate control unit 8 registers the output signals from the indoor climate sensors 4, the usage detection system 6 and the outdoor climate sensors 10, and uses these output signals to control the parameter control systems 2 according to the local control parameters 24 and the global control parameters 25 to achieve the desired indoor climate.

Figure 2:
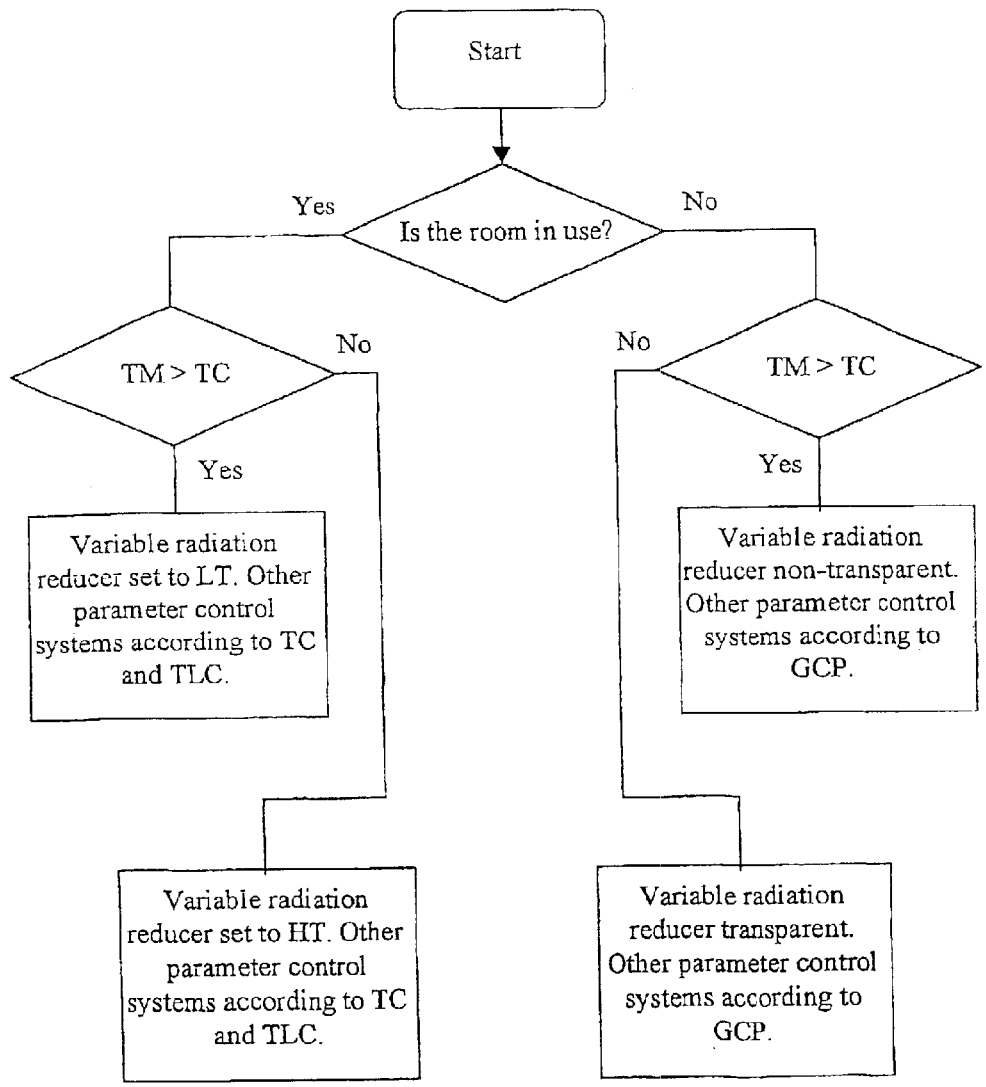
FIG. 2 is a flow chart showing a method of climate control according to the present invention.

A method for controlling a system according to this embodiment will now be described with reference to FIG. 2.

detecting, with the usage detection system 6, if the room is in use or not, detecting with the temperature sensor 22 if the room should be cooled or heated in response to an "in-use signal" from the usage detection system 6 and a "cool-signal" (TM>TC) from the temperature sensor 22, controlling the variable radiation reducer 12 to be in a low-transparent mode defined by the low-transmittance parameter 28 (LT), and other parameter control systems 2, 14, 16 in accordance with predefined local control parameters 24, 26, 30 (TC, TLC), by means of the climate control unit 8, whereby at least a part of the heat radiation may be prevented from entering the room, in response to a "non-use signal" from the usage detection system 6 and a "cool-signal" (TM>TC) from the temperature sensor 22, controlling the variable radiation reducer 12 to be in a non-transparent mode, and other parameter control systems 2, 14, 16 in accordance with predefined global control parameters 25 (GCP), by means of the climate control unit 8, whereby a substantial part of the heat radiation is prevented from entering the room, in response to an "in-use signal" from the usage detection system 6 and a "heat-signal" from the temperature sensor 22, controlling the variable radiation reducer 12 to be in a high-transparent mode defined by the high-transmittance parameter 28 (HT), and other parameter control systems 2, 14, 16 in accordance with predefined local control parameters 24, 26, 30 (TC, TLC), by means of the climate control unit 8, whereby at least a part of the heat radiation is allowed to enter the room, and in response to a "non-use signal" from the usage detection system 6 and a "heat-signal" (TM<TC) from the temperature sensor 22, controlling the variable radiation reducer 12 to be in a transparent mode, and other parameter control systems 2, 14, 16 in accordance with predefined global control parameters 25 (GCP), by means of the climate control unit 8, whereby a maximum of the heat radiation is allowed to enter the room.

As mentioned above the climate control system and method are further adapted to control the light-level, by controlling the illumination system 16, the temperature and air quality by controlling the cooling/heating system 14 and the ventilation system 15. But, as control strategies for such systems are well known in prior art, detailed control information for those are not given herein.

As the climate control system employs a usage detection system 6, it could also be integrated with a security system in the building, whereby several new features could be provided. One possible feature could be that the variable radiation-reducers 12 and the illumination system 16 remain dark if unauthorized persons enter a room.

The climate control system is also suitable for integration into a larger control system, e.g. in the advanced control and information system of an "intelligent building".

To further enhance the comfort characteristics of the system according to the invention, the system can employ predefined personal comfort profiles. In one embodiment the usage detection system may be adapted to recognize different users, and thus automatically change the desired climate in a room to the appropriate comfort profile as the user enters.

A second possible enhancement is that the in-use comfort profile is pre-activated somewhat before the user enters (or is expected to enter) the room, such that possible inconveniences due to initial poor climate are avoided. This might for instance be realized by user detection at the entrance of a building, and where the system knows which room the user normally occupies. But, as different users exhibit different habits such a system is preferably self-learning, whereby changes in habits are automatically detected and compensated for. In some particular situations the positive effects of pre-activation are more obvious than in others:

Hotels have many rooms that are unoccupied during large parts of the day, and hence large energy savings are achieved by applying a system according to the invention. But it is of great importance that the climate comfort is high when a guest enters the room. Therefore, pre-activation of the in-use comfort profile, for instance by registration in the lobby or in the elevators, is essential in this particular case.

School-buildings have certain rooms that are non-frequently used, but where subsequent use often can be predicted as the use is related to a schedule.

The invention has been described using the term variable radiation-reducer 12, as defined above, but as mechanical systems exhibit some drawbacks compared to smart windows, the use of smart windows is the preferred implementation.

A mechanical system may either be arranged on the outside, in between, or on the inside of the windows. If it is arranged on the outside, which from the heat rejecting point of view is the most beneficial, the system is further subjected to mechanical strains due to wind etc., whereby it can easily be damaged. Irrespective of where such a mechanical system is arranged the mechanical nature of the system makes it vulnerable, as it normally comprises a large number of parts and some parts may break or get worn out. Another drawback with the mechanical systems is that the radiation reducing elements normally comprise one or more non-transparent parts, which generate an unwanted pattern of silhouettes. As the transmittance for smart windows may be continuously varied from transparent to non-transparent, all such effects are avoided.

However, as the smart windows 12 that are available at present have switch-times (between non-transmittance and full-transmittance) of the order of milliseconds to tens of minutes, the daylight contribution to the light level in the room may remain low for a while after someone starts using the room. Therefore, the climate control system has to compensate for this lack of daylight by increasing the light intensity produced by the illumination system 16, and as the windows 12 become more transparent, the light intensity from the illumination system 16 is gradually reduced.

To evaluate possible savings that may be achieved by the present invention, extensive simulations have been performed.

Throughout the simulations a very simple physical description of an office module is used, in which different high performance static and variable windows are compared. Some features of the office module and the climates are also varied.

As a building simulation tool the simple hourly dynamic model presented by Keller et al. (A universally valid strategy for low energy houses. Proc. World Renewable Energy Congress VI. 1, 377–382, Edited by, Sayigh A. A. M., Brighton, July, 2000) (see also: Burmeister and Keller, Climate surfaces: A quantitative building-specific representation of climates. Energy and Buildings, 28, 167–177, 1998.) is used with TRY (Test Reference Year) weather data as input. The anisotropic Hay and Davies (see for instance: Duffy and Beckman, Solar energy of thermal processes, 2 ed., Wiley, USA. 1991) model is used for the solar radiation on vertical surfaces and the angular dependence of the transmittance of the glazings is calculated according to Karlsson and Roos (Modelling the angular behaviour of the total solar energy transmittance of windows. Solar Energy 69, 321–329, 2000). All U-values are assumed to be constant.

A "base-case" was defined as a commercial office module of a very simple "shoe box" form, described in table 1. The office module was assumed to have adiabatic surfaces in all orientations except for the front facing surface. The "free" internal heat was assumed to be 330 W during office hours, which corresponds to about 1 person, one computer and energy efficient lighting, and 0 W after working hours. Heating and cooling set points were different during working hours and non-working hours and the ventilation was reduced during non-working hours as described in table 1, wherein: GWAR denotes glazing to wall area ratio. Heating and cooling plant efficiency is set to unity. The base case window is uncoated and double-glazed.

TABLE 1

BASE CASE (south facing, no shading)

| | |
|---|---|
| Front wall U-value | 0.3 W/m²K |
| Glazing U-value | 2.9 W/m²K |
| Frame U-value | 2.2 W/m²K |
| GWAR | 30% |
| Glazing g-value | 76% |
| Time constant[1] | 180 h |

| | Working hours (8–17) | else |
|---|---|---|
| "Free" internal heat | 330 W | 0 |
| Heating set point | 20 | 17 |
| Cooling set point | 25 | 28 |
| Ventilation + infiltration | 1.1 + 0.1 ach | 1.1 * 0.25 + 0.1 ach |

Three different locations were chosen for the simulations: Stockholm (Sweden), Denver (USA) and Miami (USA), all having highly different annual average temperatures and annual solar radiation as illustrated in table 2, wherein TMY means Typical Meteorological Year and TRY means Test Reference Year.

TABLE 2

| Location | Annual average temperature (° C.) | Annual average solar radiation (kWh/m²yr, horizontal surface) |
|---|---|---|
| Stockholm (TRY) | Low (6.9) | Low (920) |
| Denver (TMY2) | Low (9.9) | High (1700) |
| Miami (TMY2) | High (24) | High (1800) |

A test set of glazings containing one uncoated, one low-e, four solar control and four smart windows as described in table 3 were used. Smart 1 and 2 are data from currently available smart windows, and SmartFict 1 and 2 are variable windows that may be available in the future. All the static glazings are commercially available, but data for the last solar control alternative was simulated, to get a static alternative with a very low g and reasonably high Tvis (double silver layer coating on grey glass). Smart 1 and 2 are data from recently released smart windows (E-Control by Pilkington Flabeg GmbH) and SmartFict 1 and 2 are data for idealised smart windows that might be available in the future. The U-value is given for the centre of glass. The "Category" parameter accounts for proper angle dependence of the transmittance according to Karlsson and Roos (2000).

TABLE 3

| Identity | Type | g (%) | U (W/m²K) | Category | Panes | $T_{vis}$ (%) |
|---|---|---|---|---|---|---|
| Clear | Clear floatglass | 76 | 2.9 | 4 | 2 | 82 |
| Low-e | Low-e | 56 | 0.9 | 3.5 | 3 | 64 |
| SolContr. 1 | Solar control | 24 | 0.8 | 2.5 | 3 | 36 |
| SolContr. 2 | Solar control | 27 | 1.2 | 2.5 | 2 | 42 |
| SolContr. 3 | Solar control | 34 | 1 | 1.5 | 2 | 67 |
| SolContr. 4 | Solar control | 18 | 1 | 1.5 | 2 | 32 |
| Smart 1 | Smart (existing) | 44/15 | 1.6 | 1 | 2 + 1 | 50/15 |
| Smart 2 | Smart (existing) | 36/12 | 1.1 | 1 | 2 + 1 | 50/15 |
| SmartFict 1 | Smart (fictitous) | 44/3 | 1 | 1 | 2 | 55/0 |
| SmartFict 2 | Smart (fictitous) | 56/3 | 1 | 1 | 2 | 65/0 |

Figure 3:
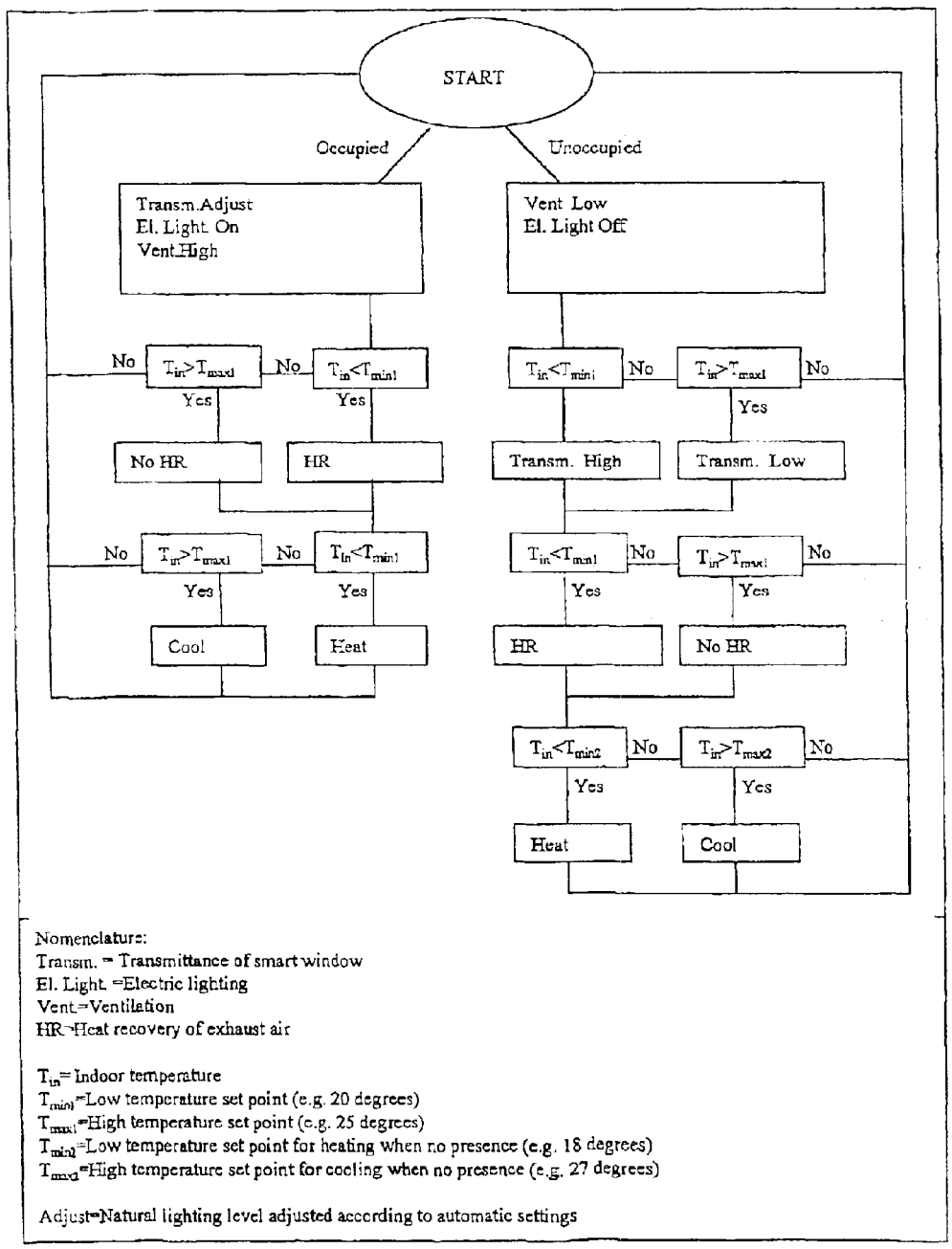
FIG. 3 shows an alternative embodiment of a method of climate control according to the present invention.

The flow chart shown in FIG. 3 shows an alternative, slightly simplified, embodiment of a method for climate control according to the present invention, which was employed throughout the simulations. This control system requires controllable HVAC (Heating, Ventilation, and Air Conditioning), lighting and switchable windows. Furthermore this would require temperature, light and occupancy sensors. In the following cases it was assumed that the occupant in the room was out of the room 25%, randomly distributed, of the office hours. Lighting was set to full when the office was occupied and zero when unoccupied, and when the office was occupied, the transmittance through the windows was controlled linearly by the impinging radiation.

Figure 4:
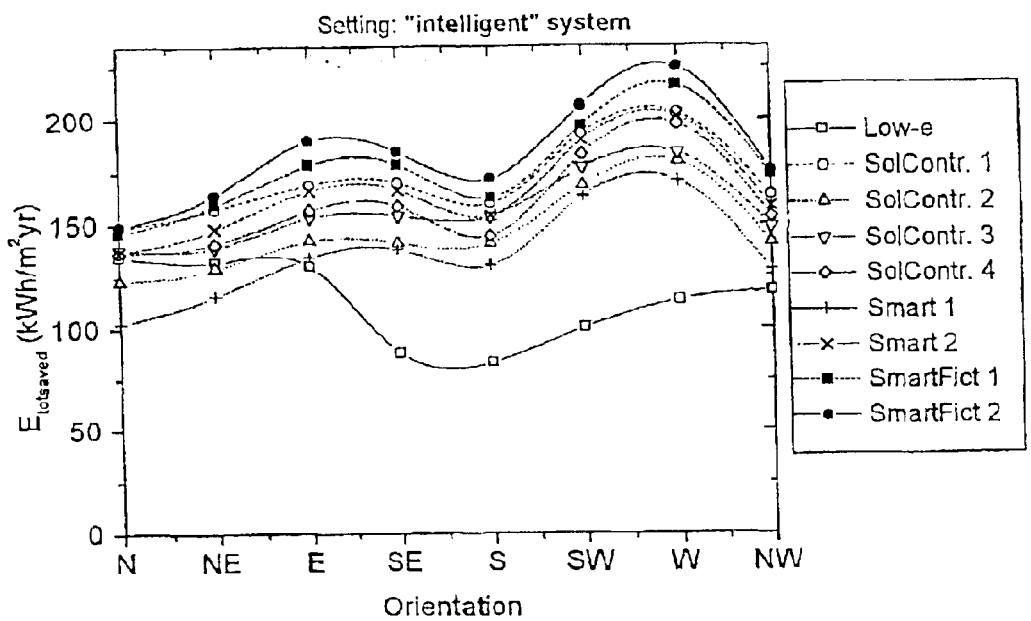
FIGS. 4–6 shows the total saved energy versus the orientation of the windows for different window alternatives with the method of climate control according to FIG. 3, compared to an uncoated double glazed window, for three climate locations.
Figure 5:
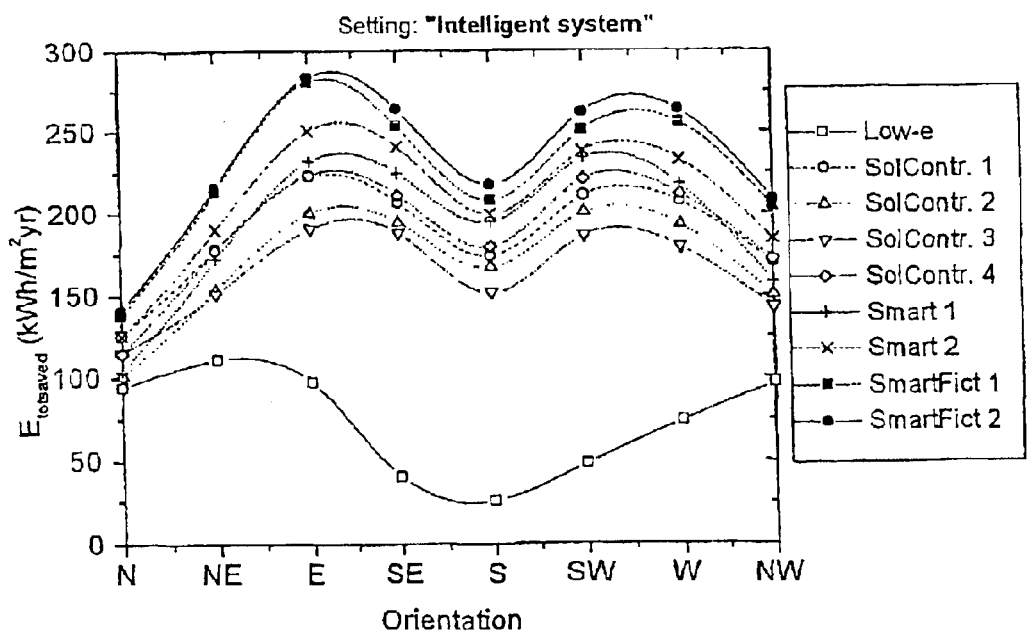
Figure 6:
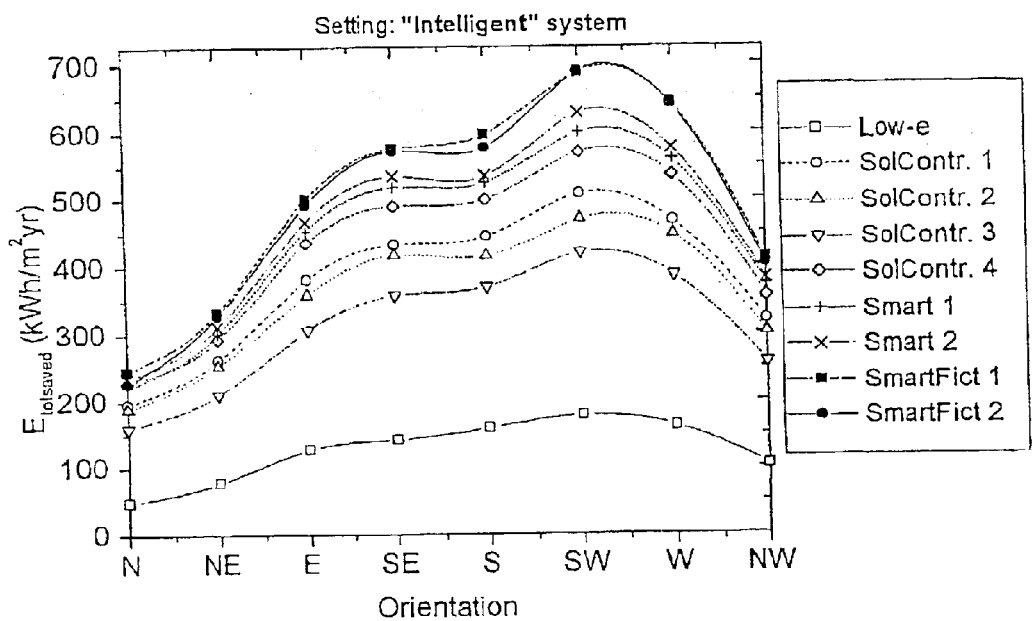

FIGS. 4–6 shows the total (heating plus cooling) saved energy versus the orientation of the windows for the different window alternatives with the intelligent HVAC/lighting/occupancy control system compared to an uncoated double glazed window for the three climate locations respectively. For comparison of best switchable window versus best static window see difference between "Smartfict 2" and "Solcontr 1". In FIG. 4 it is illustrated that with the advanced control system in Stockholm the future smart windows can, just barely, outperform the best static alternatives and the present smart windows cannot. However, in the Denver climate (FIG. 5) the saving was noticeably increased by the intelligent control system, FIG. 5. In this climate, the future smart windows illustrate savings of the order of about 50 kWh/m²yr and the best present smart window outperforms the best static by about 0–30 kWh/m²yr, depending on the orientation. Finally, for the Miami climate (FIG. 6) the intelligent control system increased the saving to about 100 kWh/m²yr and 50 kWh/m²yr for the future and the present smart window alternatives, respectively, and for south facing orientations and compared to the best static window (FIG. 6). Note that the y-axis in FIGS. 4–6 represents saving compared to the base case windows and that the total energy demand of the office module is affected by the control system for all types of windows.

Figure 7:
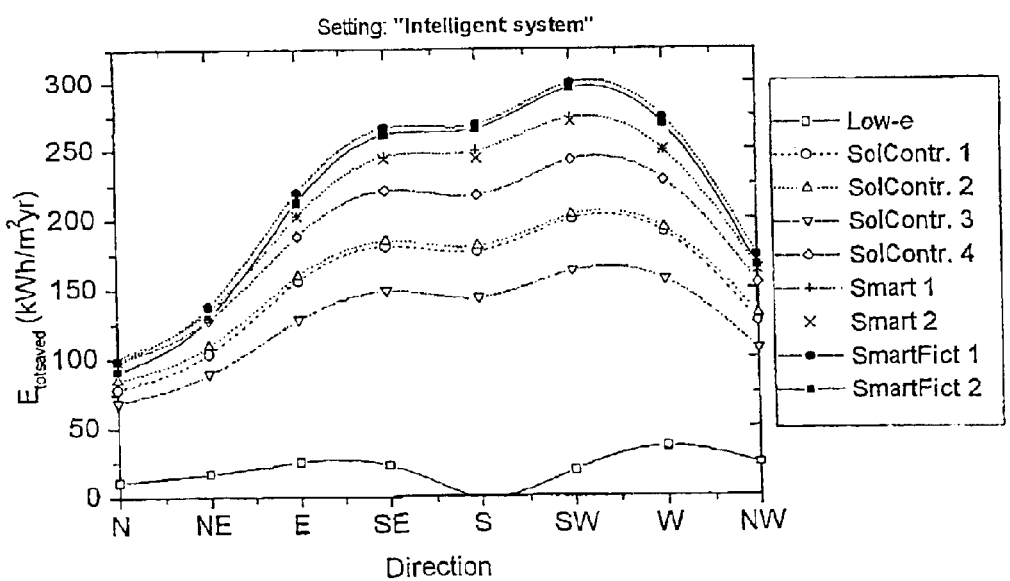
FIG. 7 shows the same figure as in FIG. 4 but with twice the internal heat production.

FIG. 7 shows the same figure as in FIG. 4 but with twice the internal heat production. For comparison of best switchable window versus best static window see difference between "Smartfict 2" and "Solcontr. 4". The saving caused by the smart window increased with increased internal heat load for the Stockholm climate. In this case the internal heat production was doubled to 660 W, which would correspond to about two persons, two computers and inefficient lighting, and it is seen that the saving with the switchable window increased to of the order of 50 kWh/m²yr compared to the best solar control window. The saving also increased for the Denver climate (to about 75 kWh/m²yr) when the internal heat was increased but that illustration is left out here.

Figure 8:
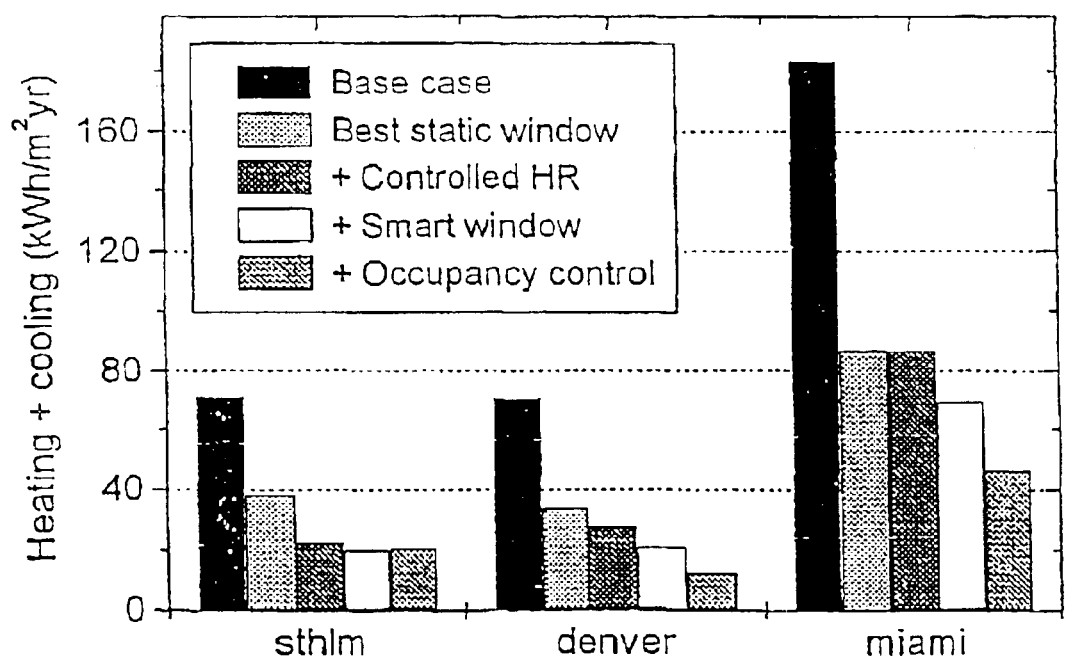
FIG. 8 shows the heating plus cooling demand per square meter floor area for the base case in three different climates.

To summarise and compare, the different changes are plotted in FIG. 8 where each measure is added to the base case. More specifically FIG. 8 shows the heating plus cooling demand per square meter floor area for the base case in the three different climates. The leftmost bar gives the demand for the base case and the staples to the right gives the demand when changing to the best static window, plus controlled heat recovery, plus best smart window, plus occupancy control with 25% randomly distributed absence. Note that the energy in FIG. 8 is given per square meter floor area as opposed to the figures above were the saving is given per square meter glazed area. For all locations it is clearly important to choose the appropriate window (and/or shading) from the beginning. Controlled heat recovery of the exhaust air is of importance in heating dominated (cold) climates and of no importance in cooling dominated climates. The ability to vary the transmittance is of great importance in sunny climates, and the saving seems to be higher the warmer and the sunnier the climate is. Furthermore, FIG. 7 demonstrates that smart windows can be beneficial in less sunny climates if in an office with a high internal heat production.

Occupancy control as described above increases the savings, especially in hot climates. The occupancy control also leads to electricity savings, not seen in FIG. 8, since the lighting and ventilation can be reduced when no one is present. Furthermore, when the office is occupied, automatically regulated light can reduce the electricity need, and if the smart window has a higher light transmittance in the transparent state than the window that it is compared with, this saving can be enhanced. In the Stockholm case (FIG. 8), the occupancy control leads to an increased heating need since "free" useful energy from persons and lighting were reduced during the 25% of time of absence. This is balanced by increased electricity savings from the reduced lighting and ventilation (not seen in FIG. 8). For the Miami case, the occupancy control leads to high cooling savings because of the reduced solar throughput and reduced internal energy from persons and lighting.

There seems to be a "trade off" situation between natural lighting and cooling, i.e. higher fraction of natural light gives higher cooling demand and if the cooling demand is reduced by lower transmittance, less natural light is available. The static windows, on the other hand, may need additional shading to avoid glare, while the smart window can automatically reduce such problems.

Approximate savings versus the best static window in an office module (as defined above) are of the order of: 0–50 kWh/m$^2$yr in a Stockholm-like climate, 25–75 kWh/m$^2$yr in a Denver-like climate, 50–150 kWh/m$^2$yr in a Miami-like climate (all given per square meter glazed area). These results will in a real situation also be affected by occupant behavior, but it is clear that the smart windows can have an equal or better energy performance than static windows and on top of this give an increased comfort with, for instance, automatic glare control. From FIG. 8 it can be further concluded that it is important to choose correct window (and/or shading). Switchable windows are beneficial in sunny climates and offices with high internal heat generation. Occupancy control saves cooling energy in the Denver-like, and even more in the Miami-like, climates. Furthermore, occupancy control, regulated lighting and ventilation also save electricity, which is not illustrated in this study.

It should further be noted that the simulated 25% time of absence is a rough approximation, and for certain cases as discussed above the real time of absence might be considerably higher. However, even with this low approximation the simulations show that smart windows with occupancy control outperform state of the art static windows when it comes to energy, yet not taking in consideration the increased level of comfort.

A number of embodiments have been described above. However, it is obvious that the design could be varied without deviating from the inventive idea of providing a more energy efficient climate control system comprising smart windows.

Therefore the present invention should not be regarded as restricted to the above disclosed embodiments, but can be varied within the scope of the appended claims. For example, the climate control system can be implemented in all kinds of constructions, such as ships, land vehicles (cars, busses), airplanes etc., and the constructive modifications needed for such implementations pertains to the field of the person skilled in the art, requiring no inventive effort.

What is claimed is:

1. A climate control system comprising:
   at least one smart window that variably reduces the transmission of heat radiation through a window into a room;
   a climate control unit coupled to and adapted to control the smart window;
   a usage detection system for detecting if the room is in use or not, the usage detection system being coupled to the climate control unit, and providing a "non-use signal" when the room is not in use and an "in-use signal" when the room is in use,
   wherein the climate control unit is arranged to set the smart window in a non-transparent mode, in response to a "non-use signal" from the usage detection system, whereby a substantial part of the heat radiation is prevented from entering the room,
   wherein the climate control unit is arranged to set the smart window in a transparent mode, in response to an "in-use signal" from the usage detection system, whereby a normal daylight level is permitted to pass through the window, and
   wherein the usage detection system detects an identification device carried by the user into the room and provides the "in-use signal" in response to the detection.

2. A method of climate control in a room using a climate control system that includes at least one smart window capable of variably reducing the transmission of heat radiation through a window into a room, and a climate control unit coupled to and adapted to control the smart window, the method comprising the steps of:
   a user setting a low transmittance parameter defining a lowest level of incoming light through the smart window accepted by the user, and a high transmittance parameter defining a highest level of incoming light through the smart window accepted by the user,
   detecting, with a usage detection system, if the room is in use or not, the usage detection system being coupled to the climate control unit, and providing a "non-use signal" when the room is not in use and an "in-use signal" when the room is in use,
   detecting with a temperature sensor if the room should be cooled or heated, the temperature sensor being coupled to the climate control unit, and providing a "cool-signal" when the room should be cooled and a "heat-signal" when the room should be heated,
   in response to an "in-use signal" from the usage detection system and a "cool-signal" from the temperature sensor, controlling the smart window to be in a low-transparent mode defined by the low-transmittance parameter, and other parameter control systems in accordance with predefined local control parameters, by means of the climate control unit, whereby at least a part of the heat radiation is prevented from entering the room, unless the low-transmittance parameter is set to a value that corresponds to full transmittance,
   in response to a "non-use signal" from the usage detection system and a "cool-signal" from the temperature sensor, controlling the smart window to be in a non-transparent mode, and other parameter control systems in accordance with predefined global control parameters, by means of the climate control unit, whereby a substantial part of the heat radiation is prevented from entering the room,
   in response to an "in-use signal" from the usage detection system and a "heat-signal" from the temperature sensor, controlling the smart window to be in a high-transparent mode defined by the high-transmittance parameter, and other parameter control systems in accordance with predefined local control parameters, by means of the climate control unit, whereby at least a part of the heat radiation is allowed to enter the room, and in response to a "non-use signal" from the usage detection system and a "heat-signal" from the temperature sensor, controlling the smart window to be in a transparent mode, and other parameter control systems in accordance with predefined global control parameters, by means of the climate control unit, whereby a maximum of the heat radiation is allowed to enter the room.

3. A climate control system comprising:

at least one smart window that variably reduces the transmission of heat radiation through a window into a room;

a climate control unit coupled to and adapted to control the smart window;

a usage detection system for detecting if the room is in use or not, the usage detection system being coupled to the climate control unit, and providing a "non-use signal" when the room is not in use and an "in-use signal" when the room is in use, wherein the climate control unit is arranged to set the smart window in a non-transparent mode, in response to a "non-use signal" from the usage detection system, whereby a substantial part of the heat radiation is prevented from entering the room, wherein the climate control unit is arranged to set the smart window in a transparent mode, in response to an "in-use signal" from the usage detection system, whereby a normal daylight level is permitted to pass through the window, and wherein the climate control unit is further arranged to have a user set a low transmittance parameter defining a lowest level of incoming light through the smart window accepted by the user and a high transmittance parameter defining a highest level of incoming light through the smart window accepted by the user.

4. A method of climate control in a room using a climate control system that includes at least one smart window that is capable of variably reducing the transmission of heat radiation through a window into a room and a climate control unit coupled to and adapted to control the smart window, the method comprising the steps of:

detecting, with a usage detection system, if the room is in use or not, the usage detection system being coupled to the climate control unit, and providing a "non-use signal" when the room is not in use and an "in-use signal" when the room is in use, in response to a "non-use signal" from the usage detection system, controlling the smart window to be in a non-transparent mode, by means of the climate control unit, whereby a substantial part of the heat radiation is prevented from entering the room, in response to an "in-use signal" from the usage detection system, controlling the smart window to be in a transparent mode, by means of the climate control unit, whereby a normal daylight level is permitted to pass through the window, and a user setting on the climate control unit a low transmittance parameter defining a lowest level of incoming light through the smart window accepted by the user and a high transmittance parameter defining a highest level of incoming light through the smart window accepted by the user.

5. A method of climate control in a room using a climate control system that includes at least one smart window that is capable of variably reducing the transmission of heat radiation through a window into a room and a climate control unit coupled to and adapted to control the smart window, the method comprising the steps of:

detecting, with a usage detection system, if the room is in use or not, the usage detection system being coupled to the climate control unit, and providing a "non-use signal" when the room is not in use and an "in-use signal" when the room is in use, in response to a "non-use signal" from the usage detection system, controlling the smart window to be in a non-transparent mode, by means of the climate control unit, whereby a substantial part of the heat radiation is prevented from entering the room, in response to an "in-use signal" from the usage detection system, controlling the smart window to be in a transparent mode, by means of the climate control unit, whereby a normal daylight level is permitted to pass through the window, and the usage detection system detecting an identification device carried by a user into the room and providing the "in-use signal" in response to the detection.

6. The method of claim 2, wherein the step of detecting if the room is in use or not comprises the steps of the usage detection system detecting an identification device carried by a user into the room and providing the "in-use signal" in response to the detection.

* * * * *